(12) United States Patent
Seltzer et al.

(10) Patent No.: US 7,258,885 B2
(45) Date of Patent: Aug. 21, 2007

(54) FLAVORED ARTIFICIAL SWEETENER

(75) Inventors: Randy Seltzer, New York, NY (US); Veronica Marano, Franklin Lakes, NJ (US); David Skowronski, Hawthorne, NJ (US)

(73) Assignee: Tasty-Trim, Inc., Secacus, NJ (US)

( * ) Notice: Subject to any disclaimer, the term of this patent is extended or adjusted under 35 U.S.C. 154(b) by 130 days.

(21) Appl. No.: 10/844,935

(22) Filed: May 12, 2004

(65) Prior Publication Data

US 2005/0191396 A1    Sep. 1, 2005

Related U.S. Application Data

(63) Continuation-in-part of application No. 10/791,119, filed on Mar. 1, 2004, now abandoned.

(51) Int. Cl.
*A23L 1/236* (2006.01)
(52) U.S. Cl. .................. 426/548; 426/96; 426/453; 426/650
(58) Field of Classification Search .................. 426/89, 426/96, 103, 443, 453, 518, 534, 548, 650, 426/658
See application file for complete search history.

(56) References Cited

U.S. PATENT DOCUMENTS

| | | |
|---|---|---|
| 3,962,468 A | 6/1976 | Pischke et al. |
| 4,004,039 A | 1/1977 | Shoaf et al. |
| 4,254,154 A | 3/1981 | Eisenstadt |
| 4,574,091 A | 3/1986 | Steensen et al. |
| 4,619,833 A | 10/1986 | Anderson |
| 4,676,989 A | 6/1987 | Barnett et al. |
| 4,758,443 A | 7/1988 | Roy et al. |
| 4,822,635 A | 4/1989 | Zanno et al. |
| 4,957,763 A | 9/1990 | Saita et al. |
| 4,981,698 A | 1/1991 | Cherukuri et al. |
| 5,098,730 A | 3/1992 | Pepper et al. |
| 5,176,928 A | 1/1993 | Shazer, Jr. et al. |
| 5,242,705 A | 9/1993 | Cailler et al. |
| 5,582,351 A * | 12/1996 | Tsau ............................ 241/17 |
| 6,365,216 B1 * | 4/2002 | Dron et al. .................. 426/548 |

OTHER PUBLICATIONS

"Calorie Control Sugar Substitute—Maple Flavor", www.edietshop.com, Sep. 2003.
"Sugarfree Sweeteners", http://easycarts.net/ecarts/MSF/Sugarfree-Sweeteners.html, Sep. 2003.
"Cinnamon Sugar Substitute, Sugar-Free; Fat-Free", www.brnardfoods.com, Sep. 2003.
"Sugar-Free Sans Sucre™ Cinnamon Sugar Substitute", http://cj.catalogcity.com, Sep. 2003.
"Elzan Sugar Sweetens Their Product Line", www.tesandcofee.net, Sep. 2003.
"Calorie Contro™ Sugar/Fat Free Flavored Sugar Substitutes", http://cj.catalogcity.com, Sep. 2003.
"Calorie Contro™ Sugar/Fat Free Flavored Sugar Substitutes", http://store.worldsearch.com, Sep. 2003.

* cited by examiner

*Primary Examiner*—Leslie Wong
(74) *Attorney, Agent, or Firm*—Gottlieb, Rackman & Reisman, P.C.

(57) ABSTRACT

A flavored artificial sweetener is made of a carrier, such as dextrose and the like, that is milled together with a flavoring agent. The mixture is then commingled with a second bulking agent, such as maltodextrin and a sweet agent, such as aspartame. The resulting sweetener has excellent taste characteristics and flowability. It can be packaged in small envelopes, canisters or bulk containers.

13 Claims, No Drawings

FLAVORED ARTIFICIAL SWEETENER

CROSS-REFERENCE TO RELATED APPLICATIONS

This is a continuation-in-part of application Ser. No. 10/791,119 filed Mar. 1, 2004, now abandonded.

FIELD OF THE INVENTION

This invention relates to a novel composition for an artificial sweetener. More particularly, this application pertains to an artificial sweetener having that includes one or more flavoring ingredients.

BACKGROUND OF THE INVENTION

People have a craving for sweet foods and drinks, however, natural sweeteners, such as sugar, have a high caloric content and therefore are conducive to weight gain. Moreover, people with certain medical conditions, such as various forms of diabetes, must severely limit their sugar intake.

In order to overcome these problems, researchers have been looking for compositions a very low or no caloric content, are sweet but otherwise have a neutral taste and can be readily used in food stuff. One of the earliest such sweeteners that is still in use is saccharin. Though it is widely used to sweeten many foods and beverages, saccharin has an aftertaste that is objectionable to some people.

Another popular artificial sweetener is aspartyl-phenylalanine methyl ester ("aspartame"). Aspartame has a sweet taste with only minimal bitterness for most people. Its onset of sweetness is only slightly slower than sucrose (the key ingredient of sugar).

Various artificial sweeteners are disclosed in, U.S. Pat. No. 5,098,730 to Pepper et al. (composition including xylitol and a reduced calorie bulking agent); U.S. Pat. No. 4,758,443 to Roy et al. (amides of aspartic acid and certain amides characterized by the presence of a thietanyl substituent); U.S. Pat. No. 4,676,989 to Barnett et al.(dipepetides of certain aminodicarboxylic acid esters); U.S. Pat. No. 4,254,154 to Eisenstadt (composition including dipeptide sweetener plus a sugar or sugar alcohol, a glycyrrhizin and cream of tartar); and U.S. Pat. No. 4,004,039 to Shoaf et al. (aspartame dispersed throughout a matrix). These patents, incorporated herein by reference, generally attempt to provide or synthesize sweeteners having the taste of the natural sweetness of ordinary sugar. However, none of these approaches were completely successful.

SUMMARY OF THE INVENTION

The present invention is a novel combination of a carrier, a bulking agent, a sweet agent and a flavor agent. In the preferred embodiment, the carrier is dextrose, the bulking agent is maltodextrin and the sweet agent is aspartame. The flavor agent may be a food grade flavor composition. Preferably, the flavor agent is added first to the carrier to form a mixture and the other agents are then commingled with the mixture to form the final product.

The artificial sweetener thus obtain has excellent taste and flowability. Moreover, when used in various foodstuff, the product does not discolor or clump.

Advantageously, the product can be provided in many different packaging styles, such as one-gram envelopes or canisters for restaurant or private use,or in bulk for industrial and commercial food applications.

DETAILED DESCRIPTION OF PREFERRED EMBODIMENTS OF THE INVENTION

Preferably, a flavored artificial sweetener prepared in accordance with this invention contains at least a carrier and/or a bulking agent, a sweet agent and a flavoring agent.

It was found that the following process resulted in a particularly advantageous artificial sweetener using dextrose, maltodextrin, aspartame and a flavoring agent as ingredients. First, the dextrose and flavoring agent are milled together. It is preferred to use an agglomerated dextrose such as Unidex™ available from Corn Products International of Bedford Park, Ill., which maintains the flavoring agent in a suitably dispersed condition within the blend. The Unidex™ product is available as porous spherical particles which exhibit good free flowing, and low dusting characteristics and are highly compressible. The preferred form of flavoring is in the form of an encapsulated spray dried powder such as Flavolope™, manufactured and distributed by Ungerer & Co. of New Jersey. Suitable flavors incorporated into the flavoring agent include natural and artificial flavors such as cinnamon, peach, lemon, French vanilla, hazelnut, and mocha. Other flavors, as well as combinations of flavors, can also be utilized as flavoring agents in the present invention.

Once the flavoring is milled with the agglomerated dextrose, maltodextrin and aspartame are dry blended with the mixture. The maltodextrin used should be in agglomerated form because it has better mixing characteristics. The composition is then milled so that it is passable through a 30 mesh screen. The composition is dry packaged into suitable packing configuration. The composition may have the following ingredients:

| | |
|---|---|
| Dextrose | 60%-90% |
| Maltodextrin | 0-5% |
| Aspartame | 3-8% |
| Flavoring | 1%-31%. |

Preferably, the artificial sweetener has the following composition:

| | |
|---|---|
| Dextrose | 60% |
| Maltodextrin | 5% |
| Aspartame | 4% |
| Flavoring | 31%. |

In this formulation, the dextrose acts as a carrier and a bulking agent. Dextrose is particularly suitable because it is sweet, provides flowability, and has no caloric value (i.e., is non-nutritive). The dextrose is also preferred because it binds well with the flavoring agent due to holes in its molecular structure that readily accept the flavoring agent and provides a better mouth feel. Of course, other ingredient(s) may be used instead of dextrose, such as fiber polydextrose, or gum Arabic or other similar ingredient that are substantially non-nutritive.

The maltodextrin is also sweet, although it is less sweet than dextrose, and is also used as a bulking agent. It may be omitted, or may be replaced with another bulking agent, such as polydextrose, gum Arabic or another low- or non-nutritive ingredient. The flavoring agent can be added to this ingredient instead of, or in addition to the dextrose.

The aspartame is the sweet agent. The flavoring agent may be commingled with the sweet agent instead of the carrier or bulking agent, however since there is less of this agent than the other ingredients, it may not be too practical to use it as the carrier for the flavoring agent as well. Other sweet ingredients that may be used include sucralose, acesulfame-K or saccharine.

Additional ingredients may also be added as required. For example, it may be desirable to add a drying agent such as silicon dioxide, tricalcium phosphate, etc.

The resulting artificial sweetener is desirable because it has sweetness characteristics similar to sugar, it pourable and spoonable and is suitable for various types of packaging such as one-gram paper envelopes, shaker canisters, and bulk containers. Moreover, the flavoring agent provides additional tastes characteristics that render the sweetener suitable for various products without the need to add additional flavors.

The many features and advantages of the invention are apparent from the detailed specification. Thus, the appended claims are intended to cover all such features and advantages of the invention which fall within the true spirits and scope of the invention. Further, since numerous modifications and variations will readily occur to those skilled in the art, it is not desired to limit the invention to the exact construction and operation illustrated and described. Accordingly, all appropriate modifications and equivalents may be included within the scope of the invention.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

We claim:

1. A method for preparing a sweetener comprising:
   (a) milling together an agglomerated carrier and an encapsulated flavoring agent;
   (b) preparing a dry blend of the milled mixture and a sweet agent; and
   (c) milling the dry blend.

2. The method of claim 1 further comprising milling so that it is passable through a 30 mesh screen.

3. The method of claim 1 wherein said carrier is dextrose and said dry bland includes a bulking agent.

4. The method of claim 3 wherein said bulking agent is maltrodextrin.

5. The method of claim 4 wherein said maltodextrin is agglomerated.

6. The method of claim 1 wherein said sweet agent is aspartame.

7. The method of claim 3 wherein the following ratios are used:
   (a) dextrose as said carrier in an amount of about 60%-90% by weight;
   (b) maltodextrin as said bulking agent in an amount of about 5% by weight;
   (c) aspartame as said sweet agent in an amount of about 3-6% by weight; and
   (d) flavoring agent in an amount of about 1%-31% by weight.

8. The method of claim 1 wherein said flavoring agent is a spray dried flavoring agent.

9. The method according to claim 1 wherein the flavoring agent is a spray dried powder.

10. The method according to claim 1 further comprising packaging the milled dry blend in one of one-gram envelopes, canisters, and bulk containers.

11. The method according to claim 1 wherein said carrier is selected from the group consisting of dextrose, polydextrose and gum Arabic.

12. The method according to claim 1 wherein said bulking agent is selected from the group consisting of maltodextrin, dextrose, polydextrose and gum Arabic.

13. The method according to claim 1 wherein said sweet agent is selected from the group consisting of aspartame, sucralose, acesulfame-k and saccharine.

* * * * *